Sept. 29, 1925.

E. R. BURTNETT 1,555,807

INTERNAL COMBUSTION ENGINE

Filed Jan. 4, 1923

Inventor:—
Everett R. Burtnett.
By Martin P. Smith, Atty.

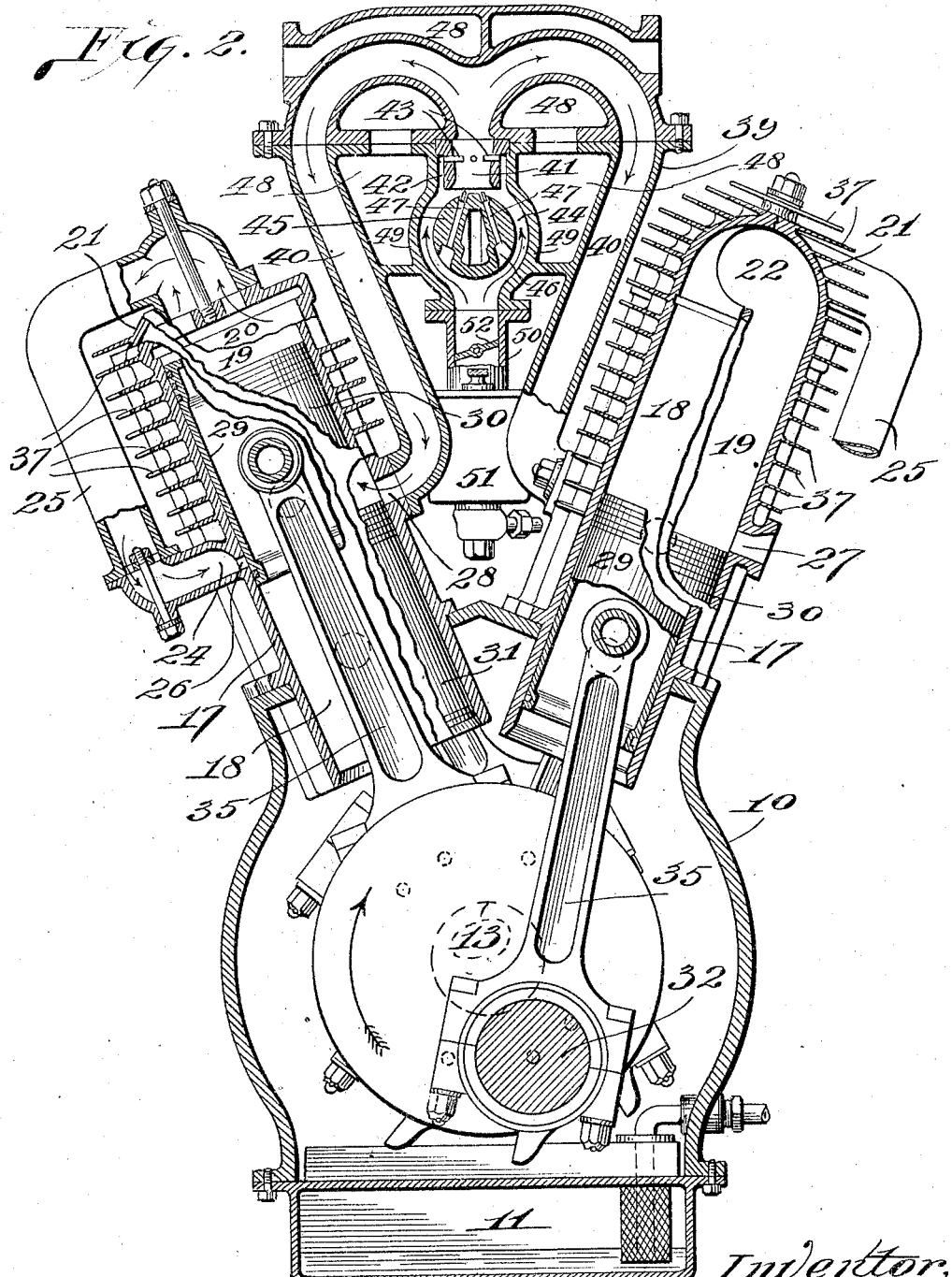

Sept. 29, 1925.  
E. R. BURTNETT  
INTERNAL COMBUSTION ENGINE  
Filed Jan. 4, 1923  
1,555,807  
3 Sheets-Sheet 3
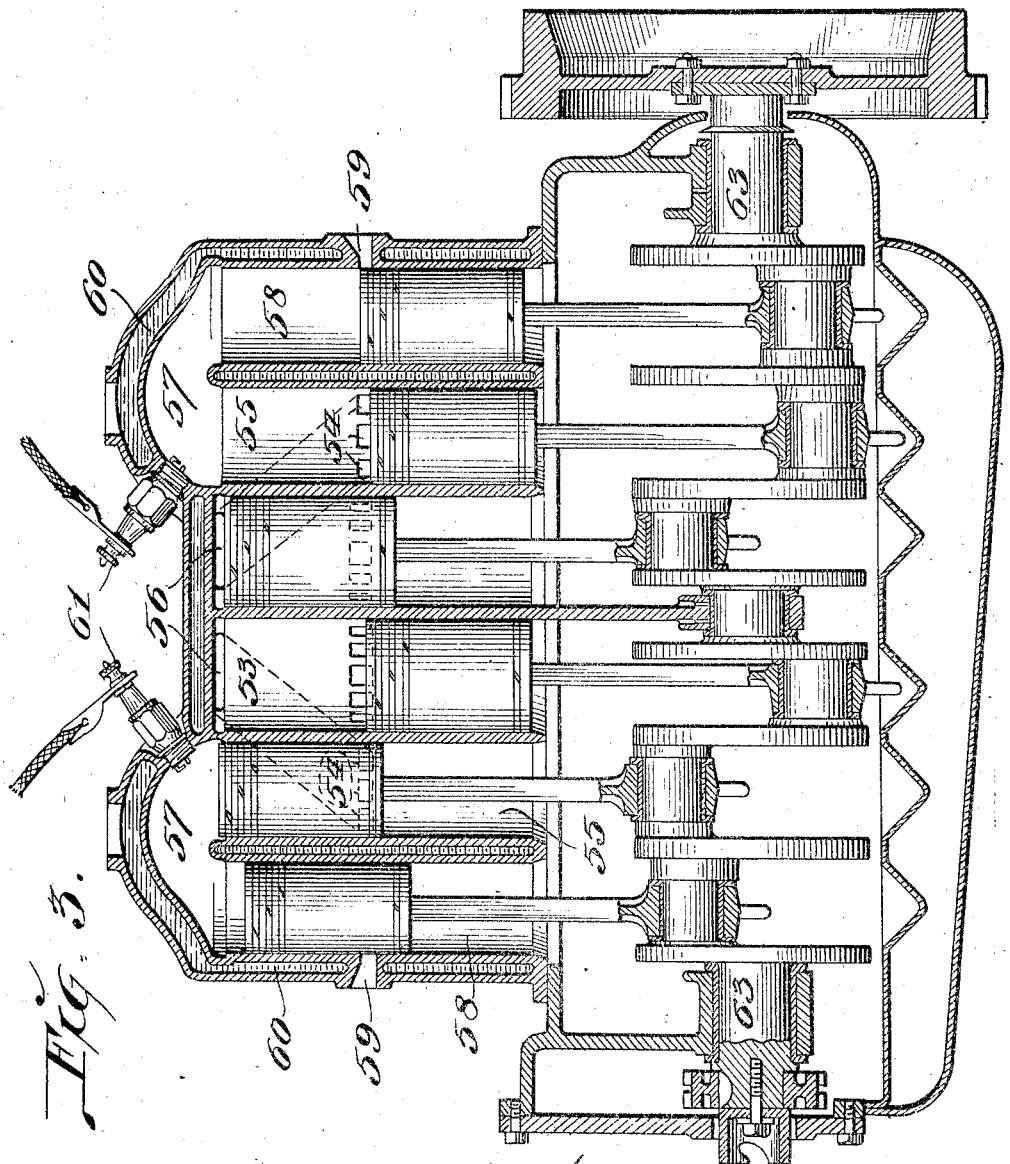

Patented Sept. 29, 1925.

1,555,807

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed January 4, 1923. Serial No. 610,700.

*To all whom it may concern:*

Be it known that I, EVERETT R. BURTNETT, a citizen of the United States, residing at Los Angeles, in the county of Los Angeles, State of California, have invented new and useful Improvements in Internal-Combustion Engines, of which the following is a specification.

My invention relates to a two stroke cycle internal combustion engine of the general type disclosed in my co-pending application for United States Letters Patent, filed Oct. 26, 1922, Serial No. 596,953, the principal objects of my present invention being to generally improve upon and simplify the construction of the engine disclosed in my application aforesaid, and to provide a relatively simple and practical structure whereby the engine is cooled by blasts of air directed onto the external surfaces of the cylinder block and particularly onto that section or area of the combustion cylinder that is subjected to the greatest heat as a result of the continued ignition of the gaseous fuel charges.

A further object of my invention is, to provide an engine having six cylinders arranged in two rows of three cylinders each, with the two rows disposed in the form of a V, all of the cylinders having pistons and all of the pistons being directly connected to a common crank shaft.

Further objects of my invention are, to combine with an engine of the character referred to, relatively simple and efficient means for very thoroughly vaporizing the liquid hydrocarbon used as fuel in the operation of the engine, to provide for the very thorough preheating of the vapor, prior to its induction into the cylinders of the engine and further to precompress the highly vaporized and heated gaseous fuel and force the same as a supercharge into the combustion chambers of the engine where it is further compressed and disposed in stratified relation with the residual products of combustion that remain in the combustion cylinders, following the ignition and expansion of each fuel charge.

With the foregoing and other objects in view, my invention consists in certain novel features of construction and arrangement of parts that will be hereinafter more fully described and claimed and illustrated in the accompanying drawings in which:—

Fig. 2 is a transverse cross section of the engine, and showing my improved form of liquid hydrocarbon vaporizer or carburetor.

Fig. 3 is a vertical section taken lengthwise through the center of a modified form of the engine, and where the six cylinders are arranged in a single row.

Figure 1:
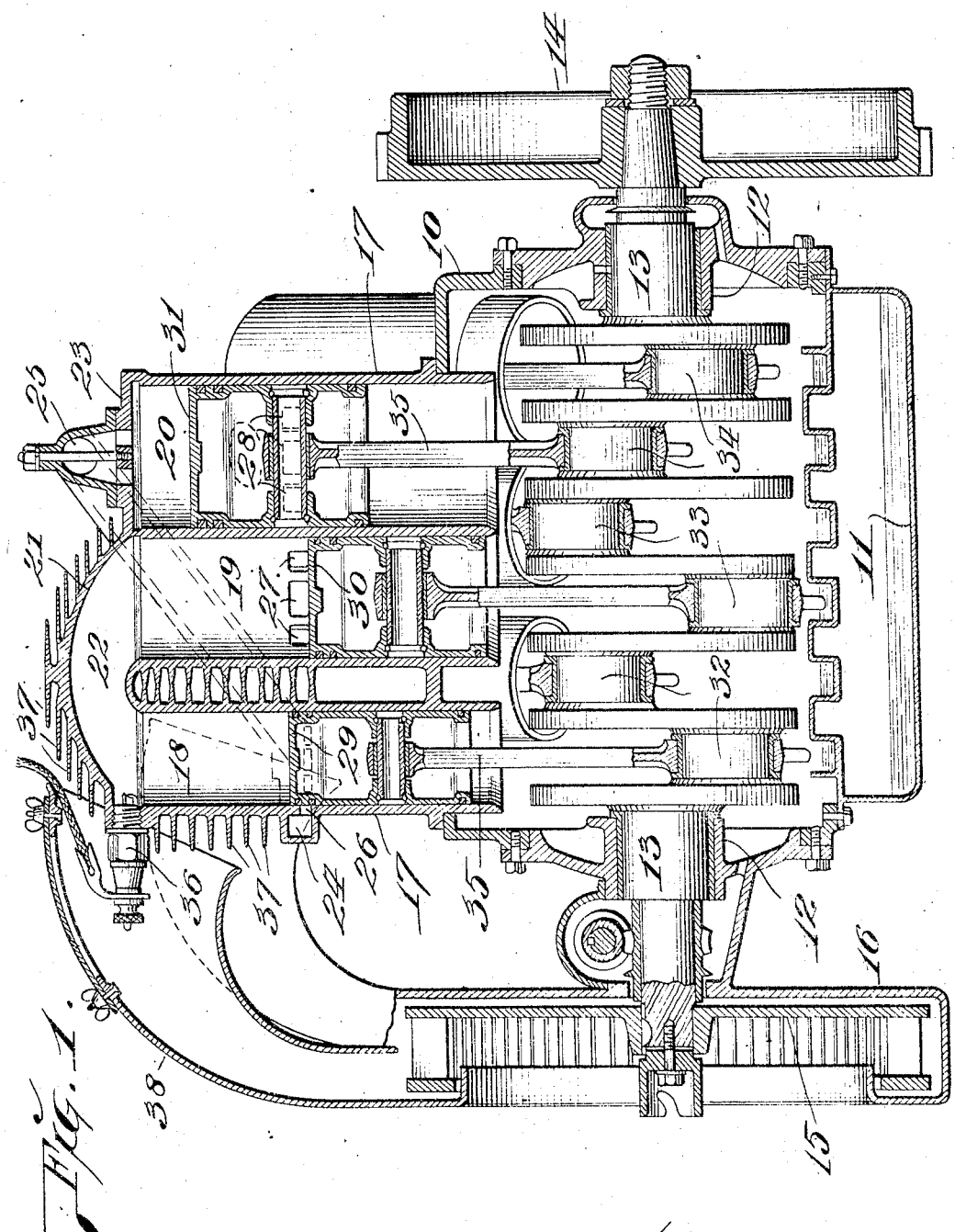
Fig. 1 is a vertical section taken lengthwise through the center of one of the rows of cylinders of my improved engine.

Referring by numerals to the accompanying drawings which illustrate a practical embodiment of my invention, 10 designates a substantially cylindrical crank case, beneath which is arranged an oil pan 11, and the ends of said crank case having suitable bearings 12 for a crank shaft 13 having six separate cranks.

One end of this shaft carries a fly wheel 14 and the opposite end carries a blast fan 15, preferably of the sirocco type and which is partially encased by a suitable housing 16.

Secured to and surmounting the crank case 10 are two cylinder blocks 17, that are practically identical in structure, and which occupy angular planes, approximately 45 or 50 degrees apart, and on opposite sides of the vertical plane that is occupied by the axis of the crank case.

Thus the two blocks are in the form of a V, with their longitudinal planes intersecting the coincident axes of the crank case and crank shaft.

Each block 17 is provided with three chambers 18, 19 and 20, the axes thereof, intersecting the axis of the crank shaft 13 and said chambers being arranged with the chamber 18 in front, or at the end of the block that is immediately adjacent to the fan 15, the chamber 19 being located immediately to the rear of chamber 18 and chamber 20, at the rear end and directly behind the chamber 19.

Chamber 19 is slightly larger in diameter than chamber 18 and, in turn, chamber 20, is slightly larger in diameter than chamber 19.

Formed integral with or fixed to the upper end of each block 17 is a head block 21 that closes the upper ends of the chambers, and formed in each head block is a pocket or recess 22 that connects the upper ends of the chambers 18 and 19.

Thus the chambers 18 and 19 connected by recess 22 constitutes a common clearance space in which compression, combustion and expansion take place.

A part 23 of head 21 closes the upper end of the precompression chamber and leading from an opening in said part 23 to an arcuate chamber 24 that partially encircles the intermediate portion of the cylinder wall that surrounds chamber 18, is a precompressed, gaseous fuel duct 25.

Inlet ports 26, establish communication between chamber 24 and the intermediate portion of chamber 18.

Leading through the wall of block 17 from the intermediate portion of each chamber 19, are exhaust ports 27 and leading through the wall of said block to the intermediate portion of each precompression chamber 20 is a gaseous fuel inlet port 28.

Pistons 29, 30 and 31 are arranged for reciprocatory movement, respectively in chambers 18, 19 and 20, and said pistons are connected respectively, to cranks 32, 33 and 34 of crank shaft 13, by ordinary connecting rods 35.

The various ports 26, 27 and 28 are located so that they are uncovered only when the respective pistons are at their low centers or at their lower limits of travel.

In order to obtain compactness of structure, and to provide for the direct connection of the six connecting rods to the cranks of the crank shaft, one cylinder block is arranged slightly in advance of the other and thus the members of the two sets or rows of chambers are staggered in relation to each other.

Seated in the upper portion of the front end of each block 17 is a spark plug 36, the inner ends of the electrodes of which project into the front end of the corresponding recess 22.

To obtain rapid elimination of the heat produced by the continued combustion of gaseous fuel in the upper portions of chambers 18 and 19 in chamber 22, the upper front portions of the walls of block 17 and the upper portion of block 21, above recess 22 are provided with heat radiating fins 37 and leading from fan housing 16 upwardly and inwardly are curved conduits 38, one for each cylinder block, and the relatively large discharge ends of conduits, are arranged so that the blasts of air passing through said conduits discharge directly onto said fins 37.

The combined vaporizer and preheater forming a part of my invention, includes a substantially heart-shaped structure 39 that is disposed between the two precompression chambers 20, and formed in said structure are ducts 40, the lower ends of which are directly connected to inlet ports 28.

The upper portions of these ducts 40 are united at a central point, directly above the upper end of a Venturi tube 41 and the lower portion of the latter being spaced apart from the surrounding wall to form a narrow annular chamber 42. Leading from this chamber into the passageway through tube 41, is a series of small jet tubes 43.

The lower end of tube 41 communicates with a chamber 44 in structure 39 and arranged in said chamber, is a substantially spherical block 45 in the lower portion of which is formed an annular groove 46.

Leading from this groove upwardly through the block 45 and discharging into the lower end of tube 41, is a series of small jet tubes 47.

Formed in the upper portion of structure 39 and surrounding the upper portions of the ducts 40 are connected chambers 48, through which may be circulated heated air or the heated products of combustion that discharge from the combustion chambers.

The chamber within the housing 49 that encloses block 45 is connected by a tube 50 to a carburetor 51 and located in said tube is a suitable throttle valve 52.

The members of each set of cranks 32, 33 and 34 are arranged so that crank 33 is approximately 45 degrees in advance of crank 32 in the direction of crank rotation and crank 34 is approximately 110 degrees in advance of crank 33 and 155 degrees in advance of crank 32 and the members of one set of cranks are disposed directly opposite or 180 degrees from the corresponding members of the other set.

The operation of my improved engine is as follows:

As the piston 31 moves downward in chamber 20, a partial vacuum is produced within said chamber and when said piston reaches low center, the corresponding ports 28 are uncovered, thereby admitting to said chamber 20, a charge of gaseous fuel that has been highly vaporized and preheated in the structure 39.

On the succeeding upward stroke of the piston 31, this inducted charge of preheated gaseous fuel will be compressed in the upper portion of chamber 20 and the duct 25 connected thereto, and when the piston 29 in the chamber 18 to which said duct is connected, passes low center, the corresponding inlet ports 26 are uncovered, thereby admitting to said chamber 18 the charge of precompressed preheated gaseous fuel.

At the time the gaseous fuel charge is thus admitted, the residual products of combustion remaining in the chambers 18, 19 and 22 are at practically atmospheric pressure, due to the fact that exhaust ports 27 were fully open an instant prior to the opening of the inlet ports 26 and the pressure of the incoming gaseous fuel charge will force practically all of the residual products of combustion through chambers 18 and 22 into chamber 19.

As pistons 29 and 30 move upwardly in their respective chambers, with piston 30 slightly in advance of piston 20, the residual products of combustion and the admitted gaseous fuel charge will be compressed in stratified relation within chamber or recess 22, with a stratum of compressed residual products of combustion within the rear portion of said recess and a stratum of compressed gaseous fuel within the forward portion of said recess and surrounding the inner end of spark plug 36.

As piston 29 passes high center, which is an instant after piston 30 has passed high center and its connecting rod and crank are "out of toggle" a spark produced between the inner ends of the electrodes, a spark plug 36, ignites the compressed gaseous fuel charge and the resulting expansion and increase of pressure will be directed against the heads of pistons 29 and 30 to move the same downwardly on the power stroke.

Crank 33 being slightly in advance of crank 32 tends to pull said crank 32 and its connecting rod "out of toggle" before the highest expansion is reached and as a result, the power of the ignited charge of gaseous fuel is compounded while being transmitted to the crank shaft.

As piston 30 passes low center and an instant before piston 29 reaches its low center to uncover inlet ports 26, the exhaust ports 27 are fully uncovered, thereby permitting the internal pressure to drop and the greater portion of the products of combustion to discharge through said exhaust ports.

These exhaust products of combustion may be taken through suitable ducts to the chambers or cells 48 for the purpose of preheating the gaseous fuel that is vaporized in structure 39.

During the operation of the engine, blasts of air from fan 15 are directed by tubes 38 directly onto the vanes that are formed on front upper end of the cylinder blocks and thus the heat resulting from the continual explosions within the combustion chambers is effectually disseminated without the necessity for the generally used cooling systems that depend on the circulation of water through pumps, tubes and cells.

The arrangement of the fan 15 and fly wheel 14 on the ends of the crank shaft and the opposite disposition of the members of the two sets of cranks, provides perfect mechanical balance for said crank shaft while the engine is in operation.

The grooves 42 and 46 in the vaporizer are designed to trap any globules of liquid hydrocarbon that may be carried up from the carburetor, and the jet tubes 43 and 47 direct the trapped liquid directly into the heated venturi, so as to effect perfect vaporization of the gaseous fuel.

In the modified construction illustrated in Fig. 3, I have shown an engine, wherein the six cylinders are arranged in a single row and with the precompression cylinders 53 immediately adjacent to each other and between the two pairs of combustion chambers.

Leading from the upper portion of each precompression chamber to inlet ports 54 are formed in the intermediate portion of the adjacent combustion chamber 55, is a compressed gaseous fuel duct 56.

Each chamber 55 is connected at its upper end by an ignition chamber 57 to the adjacent outer or end combustion chamber 58, and formed in the intermediate portion of the latter are exhaust ports 59.

The walls of the cylinder block surrounding the various chambers are provided with water circulating cells 60, for cooling purposes and seated in the cylinder-head above the inner ends of chambers 57 are spark plugs 61.

Pistons 62 are arranged for operation within the various chambers 53, 55 and 58 and said pistons being connected in the usual manner to the cranks of a crank shaft 63.

Thus it will be seen that I have produced a two stroke cycle, valveless, air-cooled combustion engine, wherein the two sets of cylinders are disposed in V-arrangement, and said engine being very compact, having perfect mechanical balance and being very economical in the production of power.

Obviously the details of construction of my improved engine may be varied in size, form and arrangement without departing from the spirit of the invention, the scope of which is set forth in the appended claims.

I claim as my invention:

1. An internal combustion engine having two rows of cylinders disposed in V-arrangement, the chambers within the first and second cylinders of each row from the front end of the engine being connected to form a common combustion and expansion chamber, a piston arranged for operation within the third cylinder of each row for compressing gaseous fuel, means for conducting the compressed gaseous fuel to inlet ports formed in the intermediate portion of the combustion chamber of the cylinder at the front end of the row.

2. An internal combustion engine having two rows of cylinders disposed in V-arrangement, the chambers within the first and second cylinders of each row from the front end of the engine being connected to form a common combustion and expansion chamber, a piston arranged for operation within the third cylinder of each row for compressing gaseous fuel, means for conducting the compressed gaseous fuel to the inlet ports formed in the intermediate portion of the chamber within the combustion cylinder at the front end of the engine and ignition means seated in the front upper portion of said front cylinder.

3. An internal combustion engine having two rows of cylinders disposed in V-arrangement, the chambers within the first and second cylinders of each row from the front end of the engine being connected to form a common combustion and expansion chamber, a piston arranged for operation within the third cylinder of each row for compressing gaseous fuel, means for conducting the compressed gaseous fuel to inlet ports formed in the intermediate portion within the combustion cylinder at the front end of the engine, ignition means seated in the upper front portion of the front cylinder, pistons arranged for operation within the first and second cylinders of each row and a crank shaft to which the pistons within all of said cylinders are connected.

4. An internal combustion engine having a pair of cylinders, the chambers within which are connected to form a common combustion and expansion chamber, one cylinder being located directly behind the other, a gaseous fuel precompression cylinder located behind and in line with the pair of combustion cylinders, means for conducting compressed gaseous fuel from the head end of the fuel compression cylinder to ports formed in the intermediate portion of the outer one of the pair of combustion cylinders, ignition means located in the upper front portion of the front cylinder, pistons arranged for operation within said chambers, and a crank shaft to which said pistons are connected.

5. The herein described method of operating a two cycle internal combustion engine having a unit composed of a pair of connected combustion chambers and a precompression cylinder which consists in inducting precompressed gaseous fuel from the precompression cylinder to the forward one of the combustion chambers, exhausting the products of combustion from the rear one of the combustion chambers, directing a blast of air against the front upper portion of the forward combustion chamber, limiting the volume induction of fresh gaseous fuel from the precompression cylinder to the connected combustion chambers to less than the maximum atmospheric capacity of said connected combustion chambers, retaining a fixed minimum volume of residual products of combustion in the rear one of the combustion chambers and which induction of the fresh fuel charge into the forward one of the combustion chambers and the retaining of a predetermined volume of residual products of combustion within the rear one of the combustion chambers is effective in producing stratification of the fresh gaseous mixture portion of the charge in the forward upper portion of dual combustion chamber, thereby confining the heat to that portion of the engine block in which the ignition means is located and against which the air blast is directed.

In testimony whereof I have signed my name to this specification.

EVERETT R. BURTNETT.